Jan. 12, 1971  D. L. JOHNSTON ET AL  3,554,705

CHEMICAL PACKAGE

Filed Aug. 14, 1969  2 Sheets-Sheet 1

INVENTORS,
VERNON W. DRYDEN,
JOHN T. DOYLE,
DONALD L. JOHNSTON
BY Ronald Zibelli
Joseph ........
ATTORNEYS

United States Patent Office 3,554,705
Patented Jan. 12, 1971

3,554,705
CHEMICAL PACKAGE
Donald LeRoy Johnston, Arcadia, and Vernon W. Dryden, Pasadena, Calif., and John T. Doyle, Lake Oswego, Oreg., assignors to Xerox Corporation, Rochester, N.Y., a corporation of New York
Continuation-in-part of application Ser. No. 645,665, June 13, 1967. This application Aug. 14, 1969, Ser. No. 860,140
Int. Cl. G01n 33/16; B01l 3/00
U.S. Cl. 23—253
47 Claims

ABSTRACT OF THE DISCLOSURE

Disposable reaction containers suitable for use with automated analytical systems. The disposable containers have at least one lower compartment for the admixing and reaction of reagents and sample material added thereto and a storage section having at least one, and preferably a plurality of, reagent storage chambers adapted for communication with each reaction compartment. The upper portions of the side walls of each reaction compartment are positioned so that all material added to each reaction compartment is channeled to the bottom portion thereof. Each reaction compartment has at least one pair of opposite side walls which are substantially vertical and define an optical window through which optical analysis is made. The substantially vertical side walls are connected to each other, in one embodiment, by side wall portions substantially perpendicular thereto and, in a further embodiment, by curved wall portions. The bottom wall can be flat or of a non-planar configuration such that, when properly positioned over an adjacent ultrasonic mixing means, tabletted materials added to the reaction compartment are effectively agitated until brought into solution.

CROSS REFERENCE TO PARENT APPLICATION

This application is a continuation-in-part of application Ser. No. 645,665, filed June 13, 1967, and now abandoned, both applications being assigned to a common assignee.

BACKGROUND OF THE INVENTION

This invention relates to automatic chemical analysis and, more particularly, to the automatic chemical analysis of body fluids, such as blood, urine, etc.

In copending application Ser. No. 602,025 filed Dec. 15, 1966, now U.S. No. 3,504,376 there is disclosed an automated chemical analytical system including a plurality of different disposable reaction containers, a magazine for the storage of the plurality of different reaction containers, a station for the addition of sample material to the reaction container, a mixing and incubation station wherein the reaction mixture is maintained in the disposable container for a period of time sufficient to culminate the chemical reaction, a detection station wherein the analytical data is obtained by monitoring one or more of the physical properties of the reaction mixture, a disposal station wherein the disposable reaction container is eliminated from the system, and means to transport the disposable reaction container from its storage area in the magazine through the system to the disposal station. The heart of the system is the disposable reaction container which, in its broad aspects, has at least one lower compartment for the admixing and reaction of reagents and sample, and an upper section having a plurality of reagent storage chambers in communication with each reaction compartment. At least one wall or end portion of the reaction compartment may be optically transparent so that upon completion of the desired chemical reaction the compartment can be utilized as a cuvette for optical analysis. Optionally, none of the walls need be optically transparent as a probe photometer such as the one disclosed in Gale 3,164,663, may be inserted into the reaction mixture and electromagnetic radiation from a source passed through a radiation conductor, the reaction mixture and back through the radiation conductor to a detection means, without the necessity of passing through the compartment walls.

In co-pending application Ser. No. 602,018, now U.S. No. 3,497,320 there is disclosed a similar, though conceptually and structurally different, analytical apparatus and system. The disposable reaction container in this application has a flexible lower compartment, i.e., one having at least one flexible wall, so that during analysis a light source and a detection means pressed against the flexible wall or walls defining the lower cuvette(s) will cause the walls to yield a distance sufficient to define a fixed optical path between the light source and the detection means through the reaction mixture. The automatic analytical apparatus includes monitoring means including a light source and a means responsive to the variations in light transmittance caused by different concentrations of a known constituent in the reaction mixture. The light source and the responsive means are pressed against opposite sides of the reaction compartment or cuvette during analysis to define a fixed optical path through the reaction mixture. Thus, there is provided an automatic analytical apparatus having the optical path defining means built into a detection station. Production requirements for the disposable reaction are less severe than when the fixed optical path is defined by the rigid walls of the reaction compartment. The reaction container can be mass produced and disposed of after use without significant cost.

SUMMARY OF THE INVENTION

Now, in accordance with the present invention, there is provided an improved disposable reaction container for use with the aforementioned analytical apparatus and systems. The disposable reaction container has at least one lower compartment for the admixing and reaction of reagents and sample material added thereto, and a storage section having at least one, and preferably a plurality of, reagent storage chambers adapted for communication with each reaction compartment. Each reaction compartment has a bottom wall and a plurality of side walls. Portions of the side walls are inclined to the vertical such that all material added to each reaction compartment is channeled to the bottom portion thereof. The inclined wall portions do not extend completely to the bottom wall but terminate at a point intermediate the open top portion of the reaction compartment section and the bottom wall of the reaction compartment. To the extent that the inclined side wall portions terminate at points equidistant from the open top portion of the reaction compartment, they define a lower plane substantially parallel to a plane passing through the flange portion of the reaction compartment section extending about the upper perimeter thereof. In a first embodiment, there are further side wall portions extending from the lower plane to the bottom wall of the reaction compartment. The further side wall portions are substantially perpendicular to said lower plane such that there is defined a substantially rectangular volume to which the materials are added. After appropriate reaction and incubation, each reaction compartment can be utilized as a cuvette for optical analysis, the optical beam being passed through a pair of substantially vertical side wall portions, defining the optical window, and the reaction mixture therebetween.

In a further embodiment, each reaction compartment has an opposed pair of side walls which are substantially vertical. The opposed side walls are connected to each other by curved wall portions which, in conjunction with the substantially vertical opposed side wall portions, define the optical cuvette. As with the preceding embodiment, optical analysis is made through the substantially vertical wall portions. When utilizing tabletted reagent formulations which are dissolved in the liquid added to the reaction compartment, it has been found that certain formulations have a tendency, when mixing is accelerated by adjacent ultrasonic energy means, to seek a static ultrasonic energy zone of limited magnitude, such as might be found in the corners of a substantially rectangular volume-defining reaction compartment. Such zones are eliminated by the design of this particular embodiment wherein the substantially vertical opposed wall portions are connected to each other by curved wall portions. With the elimination of such static energy zones, the tabletted formulation is continuously agitated until broken up and dissolved.

In a further embodiment, suitable for use with either of the aforementioned designs, the walls of the reaction compartment are transparent and rigid, the distance between one pair of opposite walls defining a fixed optical path through the reaction mixture therein. This fixed optical path or fixed distance between a pair of opposite walls is equal, within certain acceptable tolerances, for each disposable reaction container representing a single chemical analysis whereby uniformity and reliability of analytical data and results can be achieved therewith.

In a still further embodiment, also suitable for use with either of the aforementioned designs, at least one pair of opposite side walls are flexible so that a fixed optical path through the reaction mixture can be defined in conjunction with external optical path-defining means. For example, the optical path can be defined by pressing light source means against one wall and means responsive to the magnitude of light absorbed by the reaction mixture in the reaction compartment against the opposite wall. The walls of the reaction compartment will conform a distance sufficient to define a fixed optical path between the light source means and the responsive means through the reaction mixture. Thus, there is provided within each detection station means to define an optical path which will be maintained constant for each disposable reaction container representing like chemical testing units.

Optionally, a small circular compartment can be provided in the lower portion of each reaction compartment for the storage of a magnetic stirring bar which can be rotated, during incubation, to thoroughly mix the materials added to the reaction compartment. Preferably, however, the bottom wall of the reaction compartment need not be flat, as shown in FIGS. 1–5, but can be rounded or of the non-planar configuration as shown in FIGS. 6–8 hereof and in co-pending application Ser. No. 764,850, filed Oct. 3, 1968, assigned to the assignee of the present invention. Such non-planar configurations are particularly suitable for causing materials added to the reaction compartment to be thoroughly mixed, for example, by use of external ultrasonic mixing means which is effectively coupled to the added material through the non-planar bottom wall.

In a preferred form of the invention, there are provided a plurality of reaction compartments and a plurality of reagent storage chambers associated with each of said reaction compartments. By providing a plurality of reaction compartments, at least one secondary analysis can be concomitantly conducted with the primary analysis. By providing a plurality of reagent storage chambers, complex analytical procedures requiring the addition of various reagents at specified times during the analytical procedure can be conducted. When using such a disposable reaction container, the substantially vertical side walls through which optical analysis is made are those side wall portions of each reaction compartment which are substantially parallel to the longitudinal axis of the container. An example of such analysis and the optical window through which analysis is made can be seen, for example, in FIG. 5.

BRIEF DESCRIPTION OF THE DRAWINGS

The nature of the invention will be more easily understood when it is considered in conjunction with the accompanying drawings wherein:

Referring to FIGS. 1–4, there is seen a disposable reaction container 10 having a lower section 12, an upper section 14 and a restraining layer 16 for maintaining stored reagents in the plurality of reagent storage chambers 18, 20, 22, etc. Lower section 12 has two separate lower compartments 24 and 26. Each lower compartment has a bottom wall 28, exterior side walls 30, 32 and 34 and interior wall 36. The wall portions of compartments 24 and 26 terminate in a horizontal flange 38 which encircles the outer perimeter of the two compartments and holds them together as a distinct unit. Bottom wall 28, as shown, is parallel with horizontal flange 38 with walls 30, 32, 34 and 36 being perpendicular thereto, the five walls thus defining a rectangular volume having slightly rounded edges and corners. Bottom wall 28 need not be flat, as shown in FIG. 5, but can be rounded or of the non-planar configuration as shown in FIGS. 6–8 or in co-pending application Ser. No. 764,850 as indicated above. The non-planar configurations are particularly suitable for causing materials added to the reaction compartment to be thoroughly mixed, for example, by use of ultrasonic mixing means which is effectively coupled to the added materials through the non-planar bottom wall. The rectangular volume does not extend all the way from bottom wall 28 to flange 38 but terminates intermediate these two elements. The lines of termination of the rectangular solid along each wall define a plane which is parallel to the plane of horizontal flange 38. From this plane the walls diverge upwardly and outwardly as at 30', 32', and 34', and 36' until they intersect with horizontal flange 38 to define a rectangular opening beneath the plurality of reagent storage chambers when upper section 14 is in position on flange 38. Walls 30', 32', 34' and 36' need not be planar, as shown, but can be, for example, curved, if desired. Or mixtures of appropriate planar and non-planar walls can be selected as found suitable for the purpose at hand. It is only necessary that the walls not interfere with the reagent dispensing operations and that they channel all added material to the lower portion of each reaction compartment so appropriate mixing can be achieved. As shown walls 32' terminate in a short leg 32" just prior to its intersection with flange 38, leg 32" being perpendicular to flange 38. If desired this leg can be omitted whereby walls 32 will diverge upwardly and outwardly from the plane at the top of the rectangular volume until they intersect with flange 38. The shape of the opening is not critical as long as it will not interfere with the introduction of sample and reagents into the lower compartment. The sloping walls channel all materials downward toward the bottom of the reaction compartment. Interior walls 36 extend to the plane of horizontal flange 38 and are connected to each other at line 40 thereby forming a distinct barrier between compartments 24 and 26.

Figure 2:
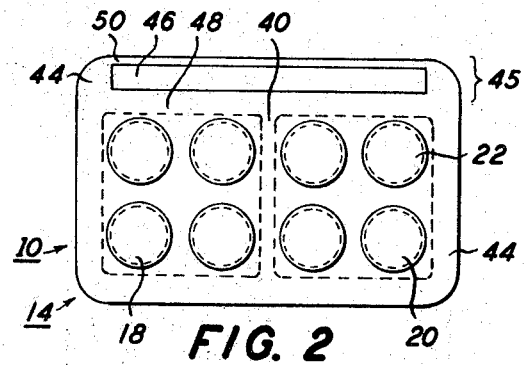
FIG. 2 is a top view of the disposable container of FIG. 1.

Resting on flange 38 and barrier line 40 is an upper storage section 14 including restraining layer 16. Upper storage section 14 comprises an upper layer 42 defining a plurality of reagent storage chambers 18, 20, 22, etc. in the form of "top-hats." On the underneath or open portion of layer 42 is a thin, weak restraining layer 16 for holding the reagents in the respective chambers. Application of force on the top of the chambers will cause a shearing of restraining layer at a point immediately below the "top-hat" resulting in the inversion thereof. Reagent or other materials stored therein will be emptied into the lower compartment. Upper section 14 has a flange 44 extending around the perimeter of the plurality of reagent storage chambers. One side of this flange which extends the length of the disposable reaction container is slightly wider than the border which encircles the remainder of the upper storage section 14. This wider portion is indicated at 45. Flange 38 which encircles the upper perimeter of the lower section is also wider along this side as is restraining layer 16. Thus, the rectangles with slightly rounded edges formed by flange 38 encircling the upper perimeter of lower section 12, flange 44 encircling the lower perimeter of upper section 14, and restraining layer 16 are of equal size and dimension so that the three members can be suitably joined to provide a unitary disposable container. Preferably, each member is formed out of a plastic material which can be heat sealed to the other two members to provide an exceptionally strong bond which cannot be broken under normal use. Flanges 38 and 44 and restraining layer 16 are sufficiently wide along the wider portion 45 so that a code area 46 can be provided between inner bond 48 and outer bond 50. Any suitable type of coding can be placed on this code area to indicate or record any information which desirably should be known during a chemical analysis, such as the actual test which has been pre-stored in the particular disposable reaction container, patient number, instructions for the associated automatic analytical apparatus and system, analytical results, etc. Typical codes include binary coding in the form of light and dark areas, magnetic coding, etc.

Situated below bottom wall 28 and in communication with each reaction compartment is a cylindrical recess 52 for the storage of a magnetic stirring bar 54. As shown, compartment 52 has a bottom wall 56 and a circular wall 58. The shape of the storage recess is not critical as long as the magnetic stirring bar can easily drop into the recess when the bar is not in use. With the reaction mixture in the lower compartment, the disposable container is moved to a mixing station where an external rotating magnetic field is applied, such as by a rotating magnetic bar. The rotation of the magnetic bar within the disposable container creates a vortex and by regulating the rotational speed of the magnetic stirring bar, it is possible to thoroughly mix all the reagents with the sample as well as clean the walls of the reaction compartment and the lower extension of the upper section of undissolved reagents. This ensures that all reagents are present in the reaction mixture in the proper amounts. Upon completion of the mixing operation, the magnetic stirring bar will settle into its storage recess 52 out of the way of optical analysis which proceeds through the side walls forming the rectangular volume of each reaction compartment. An exemplary magnetic stirring bar comprises a small cylindrical section of stainless steel wire. Should the magnetic material have a deleterious effect on the assay, then the stirring bar is entirely covered with a material which will not interfere in the analytical procedure, such as a complete coating of glass or plastic.

In operation, container 10 is taken from a supply magazine and passed to a sample addition station where the proper amount of sample diluted with distilled water is aliquoted into compartment 24. This addition is accomplished by injecting the sample solution through a needle which has been inserted through upper section 14 and restraining layer 16. Preferably, this insertion is made at a point which will not cause undue rotation of the supported container. For example, with a container as shown in the figures, the insertion for each compartment can be made at a point approximately equidistant from the centers of the four storage chambers 18, etc. The sample-holding container is then passed to a reagent addition station where the application of a pushing force on each storage chamber causes the reagent stored therein to be emptied into the appropriate compartments. Reagent addition can be done in one operation or it can be done sequentially as is necessary to complete the analytical procedure. If done sequentially, the addition can be done during or after incubation. In essence, reagents can be added any time prior to final detection as determined by the particular analytical procedure utilized. Container 10 is passed to a mixing station where it is maintained for a time sufficient to ensure the dissolution of all solid materials in the liquid contained in the lower compartments. The container next passes to an incubation station where appropriate reaction conditions are imposed upon the materials within the container for a time sufficient to complete the desired reacion which is then measured at a detection station. It is not necessary that the mixing and incubation stations be separate and distinct as it is contemplated that these operations may be performed in a single station.

At a detection station, light of appropriate wavelength is passed from a light source through the reaction mixture to detection means situated on the opposite side of the reaction mixture from the light source. The amount of light transmitted (or, conversely, the amount of light absorbed) at the testing wavelength will be representative of the amount of the constituent under analysis in the test solution.

Preferably, the disposable container as shown in the drawings is used in conjunction with a double-beam detection mechanism. In one compartment there is provided a solution of the material being tested with all the reagents which will bring the reaction mixture to the desired point for analysis. The other compartment contains a solution of the material being tested in the absence of reagents. In certain instances, one or more reagents can be added to this latter solution, provided the reagents do not carry the reaction to completion or do not adversely affect, in any other way, the optical analysis. This latter solution is called a "critically incomplete blank" and will enable the analytical system to compensate for the effects of the sample and the reagents added thereto. To maintain the detection mechanism in calibration, standard solutions are passed through the detection mechanism at intervals so that the latter can adjust for deviations which occur during operation.

Optionally, light from the light source and light which has passed through the reaction mixture can be conducted to the disposable container and the detection means, respectively, through light conduits which are pressed against an opposite pair of rigid walls which comprise a portion of the lower compartment. In this embodiment, the optical path is defined by the distance between the opposite walls of the lower compartment against which the light conduits are pressed. Since it is preferred to maintain this optical path constant for all like analytical procedures, strict production requirements must be met in the production of disposable containers having rigid lower compartment walls.

Figure 5:
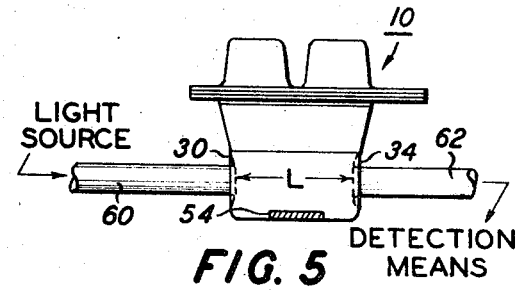
FIG. 5 is an end view of a further exemplary disposable container of the present invention during optical analysis.
Figure 1:
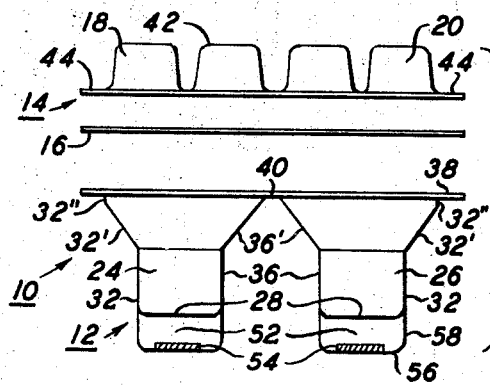
FIG. 1 is an exploded side view of an exemplary disposable reaction container of the present invention.
Figure 3:
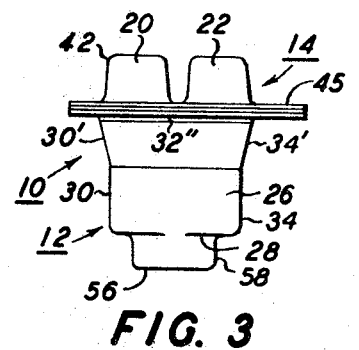
FIG. 3 is an end view of the disposable container of FIG. 1.
Figure 4:
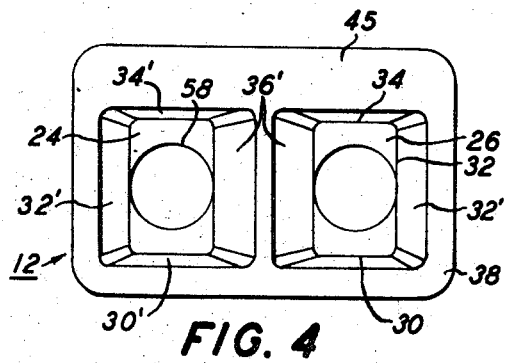
FIG. 4 is a top view of the lower section of the disposable container of FIG. 1.

Referring to FIG. 5, there is seen a disposable reaction container which is similar to the container of FIGS. 1–4 except (1) the compartments 52 for the storage of the magnetic stirring bar have been deleted and (2) the walls defining the lower compartments 24 and 26 are flexible. These two modifications need not be made together but can be made separately as is desired. In the detection station as illustrated in FIG. 5, a light source and a detection means are pressed against the flexible walls defining the lower compartments. The walls yield a distance sufficient to define a fixed optical path between the light source and the detection means through the reaction mixture. Thus, as shown in FIG. 5, light conduits 60 and 62 are pressed against walls 30 and 34, respectively, of each lower compartment. Conduit 60 is connected at the opposite end to a light source (not shown) which can be filtered to provide light of a desired wavelength or wavelengths. Conduit 62, directly opposite conduit 60, is connected to an appropriate detection means (not shown) for monitoring the intensity of the light passed through the liquid mixture in the lower compartment. During the actual analysis, conduits 60 and 62 are moved toward each other whereby the flexible walls of the compartment will deform and assume the position as shown by the dotted lines thus defining a fixed optical path L between the interior sides of deformed walls 30 and 34. By providing a fixed optical path L in this manner, it is easier to mass produce the disposable container as a certain critical feature, the optical path, has been eliminated as a strict production requirement. The optical path-defining means is now built into the detection station and, as would be expected, significantly less detection stations should be produced than disposable containers. Since a fixed optical path is defined by the detection station and will be the same for each container passing therethrough, highly accurate and reliable data can be obtained with this system.

It is also contemplated that the disposable reaction container 10 as shown in FIG. 5 can be used in conjunction with a double-beam detection mechanism, as described above in relation to FIGS. 1–4.

Figure 8:
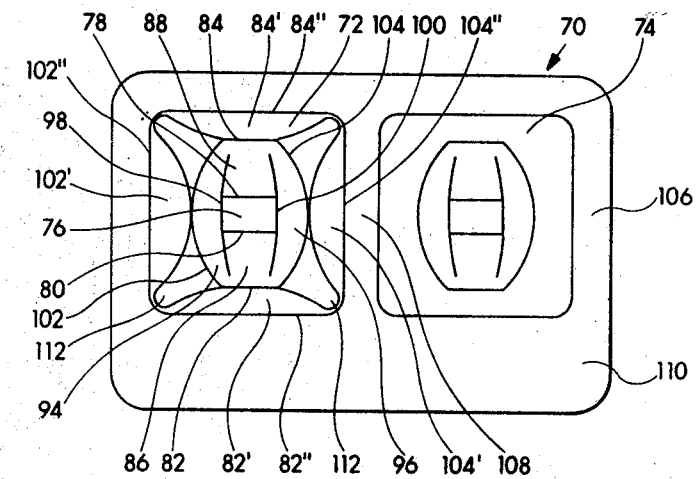
FIG. 8 is a top view of the lower reaction compartment section of FIG. 6.
Figure 6:
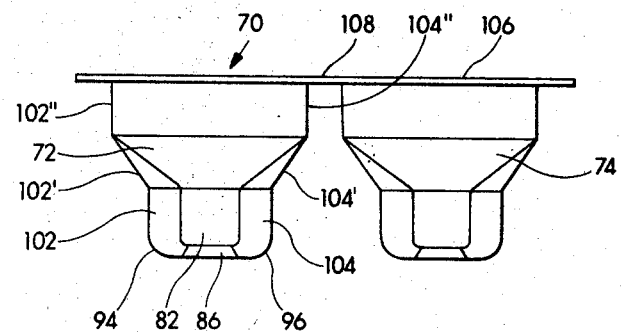
FIG. 6 is a side view of a further embodiment of the lower reaction compartment section of a disposable reaction container of the present invention.
Figure 7:
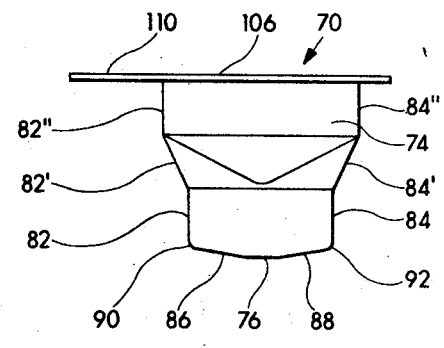
FIG. 7 is an end view of the lower reaction compartment section of FIG. 6.

Referring to FIGS. 6–8, there is seen a lower reaction compartment section 70 having two separate reaction compartments 72 and 74 for the admixing and reaction of materials added thereto. In the following description only a single set of reference numerals will be used to describe the respective reaction compartments though, as shown, the compartments are identical. Each reaction compartment has a small flat portion 76 at the bottom thereof which serves to couple the ultrasonic energy from an adjacent ultrasonic generating means to the materials previously added to the reaction compartment. From the edges of each flat portion 76, the walls defining the lower portion of each reaction compartment are slightly rounded and/or substantially flat surfaces diverging slightly upwardly toward the adjacent side walls. As can best be seen in FIG. 7, and to some extent in FIG. 8, opposite edges 78 and 80 of each flat portion 76 are connected to substantially vertical side wall portions 82 and 84, respectively, by substantially flat portions 86 and 88. The actual connections between substantially flat portions 86 and 88 and walls 82 and 84, respectively, are slightly rounded connections 90 and 92, as can best be seen in FIG. 7. Slightly rounded wall portions 94 and 96 connect opposite edges 98 and 100, respectively, with curved side walls 102 and 104, respectively, as can best be seen in FIGS. 6 and 8. Thus, flat wall portion 76, rounded wall portions 94 and 96 and substantially flat wall portions 86 and 88 define the lower extremity of each compartment such that flat portion 76, when properly positioned over an ultrasonic generating means, effectively couples the ultrasonic energy produced thereby with the materials previously dispensed into the reaction compartment. This is particularly advantageous where tabletted materials have been dispensed into the reaction compartment over flat bottom wall portion 76. The provision of curved side walls 102 and 104 prevents the tabletted material from finding a static ultrasonic energy zone of limited magnitude in which it can reside and thus avoid agitation and subsequent dissolution. Since the tablet no longer remains trapped in such a low energy zone, its movement through the reaction mixture is continuous and the agitation caused by the ultrasonic generating means is sufficient to bring the tabletted formulation into solution.

The side wall portions of compartments 72 and 74 terminate in a horizontal flange 106 which encircles the upper perimeter of the two compartments and holds them together as a distinct unit. Each flat wall portion 76 is parallel or substantially parallel with horizontal flange 106. Substantially vertical sides 82 and 84 do not extend vertically all the way to flange 106 but rather, as shown, diverge outwardly as walls 82' and 84' which terminate in legs 82'' and 84'', respectively, just prior to the intersection thereof with flange 106, legs 82'' and 84'' being substantially perpendicular to flange 106.

As can best be seen in FIG. 6, curved side walls 102 and 104 diverge upwardly as walls 102' and 104' which terminate in legs 102'' and 104'', these legs also being substantially perpendicular to flange 106. Legs 82'', 84'', 102'' and 104'' define positive aligning surfaces which can be properly manipulated and positioned during manufacture of the reaction compartment section and the disposable container as well as during transportation of the disposable container through the aforementioned automated analytical system. Though it is preferred to have such positive aligning surfaces, they can be omitted, if desired, whereby the side walls defining each reaction compartment will diverge upwardly and outwardly until they intersect with the encircling flange. The respective side wall portions of each reaction compartment intersect with each other in such a manner as not to adversely affect the addition of material to the reaction compartment or to cause the formation of low energy zones which might adversely affect tablet dissolution. Such intersections are exemplified by wall portions 112.

As shown, the side walls defining each reaction compartment define a substantially rectangular opening through which materials are added thereto. The shape of the opening is not critical as long as it does not interfere with the introduction of sample material and reagents. The sloping walls in the upper portion of each compartment assist in downward channeling all materials towards the bottom of the compartment. A portion of flange 106 acts as a distinct barrier 108 between adjacent compartments such that material added to one compartment cannot be admixed with material from the adjacent compartment.

Resting on flange 106 is an upper storage section (not shown). Suitable upper storage sections can be seen in FIGS. 1 and 2 hereof or in co-pending applications Ser. Nos. 693,400; 693,401; 693,628; 693,629; all filed Dec. 26, 1967; now U.S. Pat. Nos. 3,477,821, 3,480,398, 3,480,399 and 3,477,822, respectively; and Ser. No. 778,185, filed Nov 22, 1968; all applications being assigned to the assignee of the present invention. The particular advantages of the various upper storage sections are indicated in the respective applications. While the present invention is not directed to a particular design of the reagent storage section, the storage section described in application Ser. No. 778,185 has been shown to be particularly suitable for use in conjunction with the admixing compartment section described herein. In combination, accurate and repeatable dispensing and mixing of tabletted reagent formulations has been achieved, followed by optical analysis through the appropriate side wall portions such that clinically valuable analytical data is obtained.

Flange 106 has a slightly wider portion 110 adapted for the storage of information thereon.

Vertically extending side wall portions 82 and 84 define an optical window through which appropriate optical analysis can be made. Light of appropriate wavelength is passed from a light source through walls 82 and 84 and the reaction mixture therebetween to detection means situated on the opposite side of the reaction mixture from the light source. The amount of light transmitted (or conversely, the amount of light absorbed) by the reaction mixture at the testing wavelength will be indicative of the concentration of the constituent under analysis in the sample aliquot.

It is contemplated that the lower reaction compartment section of FIGS. 6–8, or a disposable reaction container incorporating such a lower section, can be used in conjunction with a double-beam detection mechanism or with external optical path-defining means, for example, as described in FIG. 5 hereof. Additionally, the bottom wall of the reaction compartments can be flat, as shown in FIG. 5 hereof, though it is presently preferred to use the non-planar configuration described herein and in co-pending application Ser. No. 764,850.

A more complete discussion of further modifications in the disposable container design, reagent storage techniques, the automatic analytical apparatus and system with which the disposable reaction containers of the present invention are to be utilized, etc., is given in Ser. Nos. 602,018 and 602,025. Reference is made thereto for said complete discussion. Portions of those applications which are necessary to a complete understanding of the present invention are incorporated herein by reference.

While the invention has been described with reference to preferred embodiments thereof, it will be understood by those skilled in the art that various changes in form and detail may be made without departing from the true spirit and scope of the invention. Accordingly, all modifications to which the present invention is readily susceptible, without departing from the spirit and scope of this disclosure, are considered part of the present invention.

What is claimed is:

1. A disposable reaction container comprising a lower section having at least one compartment for the admixing of material added thereto, said lower section having a flange adjacent the upper perimeter thereof, the lower portion of each compartment comprising a bottom wall and a plurality of side walls, at least one pair of opposite side walls being sufficiently optically transparent and substantially vertical thereby defining an optical window through which optical analysis can be made, said side walls being coupled to said flange by at least one pair of upwardly and outwardly diverging side wall extensions adapted to channel material added to said compartment to said lower portion thereof, an upper section securely mounted on said flange and having at least one separate reagent storage chamber adapted for communication with each of said compartments, and restraining means to prevent the premature movement of prepackaged reagents from each of said storage chambers.

2. The disposable reaction container of claim 1 wherein there are a plurality of separate admixing compartments and a plurality of reagent storage chambers adapted for communication with each of said compartments.

3. The disposable reaction container of claim 2 wherein said upper section has a flange which encircles the lower perimeter thereof and surrounds said plurality of reagent storage chambers, said upper section flange being wider along one longitudinal portion thereof and adapted for the storage of information thereon, the area circumscribed by said upper section flange being substantially rectangular and substantially equal to the area circumscribed by said lower section flange.

4. The disposable reaction container of claim 2 wherein said substantially vertical side walls of each compartment are disposed substantially parallel to the longitudinal axis of said disposable reaction container.

5. The disposable reaction container of claim 1 wherein said bottom wall of each compartment is flat.

6. The disposable reaction container of claim 1 wherein said bottom wall of each compartment is of non-planar configuration and adapted to effectively couple the transducing action of an ultrasonic mixer adjacent thereto whereby materials added to each admixing compartment can be thoroughly mixed.

7. The disposable reaction container of claim 1 wherein said substantially vertical opposite side walls are connected to each other by side walls substantially perpendicular thereto, said side walls defining a substantially rectangular volume at the lower portion of each compartment through which optical analysis can be made.

8. The disposable reaction container of claim 1 wherein said substantially vertical side walls are connected to each other by curved wall portions thereby eliminating corners or zones to which tabletted formulations might tend to gravitate during ultrasonic agitation thereof.

9. The disposable reaction container of claim 1 wherein said upper section has a flange which encircles the lower perimeter thereof, said upper section flange being wider along one portion thereof and adapted for the storage of information thereon.

10. The disposable reaction container of claim 1 wherein all of said side wall extensions diverge upwardly and outwardly from said side walls substantially until each of said extensions intersects with said flange.

11. The disposable reaction container of claim 1 wherein the other pair of side wall extensions extend substantially vertically from said side walls to the intersection thereof with said flange.

12. The disposable reaction container of claim 1 wherein each of said side wall extensions diverges upwardly and outwardly from said side walls toward said flange, at least one opposed pair of said side wall extensions terminating in uppermost side wall extensions immediately adjacent said flange and perpendicular thereto.

13. The disposable reaction container of claim 1 wherein the restraining means comprises a shearable layer disposed adjacent the openings of said reagent storage chambers, said shearable layer being sufficiently strong so that it will shear only below a particular reagent storage chamber when application of force is made thereto from within said reagent storage chamber.

14. A disposable reaction container comprising a lower section having at least one compartment for the admixing of material added thereto, said lower section having a flange adjacent the upper perimeter thereof, the lower portion of each compartment comprising a bottom wall and substantially parallel and substantially perpendicular side walls, said side walls defining a substantially rectangular volume terminating in its uppermost portion in a plane substantially parallel to said flange, at least one pair of opposite side walls defining a portion of said rectangular volume of each compartment being substantially vertical and sufficiently optically transparent so that optical analysis can be made therethrough, said side walls comprising said substantially rectangular volume being coupled to said flange by at least one pair of upwardly and outwardly diverging side wall extensions adapted to channel material added to said compartment to said substantially rectangular volume portion thereof, an upper section securely mounted on said flange and having at least one separate reagent storage chamber adapted for communication with each of said compartments, and restraining means to prevent the premature movement of prepackaged reagents from each of said storage chambers.

15. The disposable reaction chamber of claim 14 wherein there are a plurality of separate admixing compartments and a plurality of reagent storage chambers adjacent each admixing compartment, said opposed pair of substantially vertical and sufficiently optically transparent side walls of each compartment being disposed substantially parallel to the longitudinal axis of said disposable reaction container.

16. The disposable reaction container of claim 14 wherein said upper section has a flange which encircles the lower perimeter thereof, said upper section flange being wider along one portion thereof and adapted for the storage of information thereon.

17. The disposable reaction container of claim 14 wherein all of said side wall extensions diverge upwardly and outwardly from said plane substantially until each of said side wall extensions intersects with said flange.

18. The disposable reaction container of claim 17 wherein at least one opposed pair of side wall extensions terminate in uppermost side wall extensions immediately adjacent said flange and perpendicular thereto, said uppermost side wall extensions defining positive aligning surfaces adapted to aid in the positioning of said disposable reaction container.

19. A disposable reaction container comprising a lower section having a plurality of separate compartments for the admixing of materials added thereto, said lower section having a flange which encircles the upper perimeter of said lower section, the lower portion of each compartment comprising a bottom wall and substantially parallel and substantially perpendicular side walls, said side walls defining a substantially rectangular volume terminating in its uppermost portion in a plane substantially parallel to said flange, each of said side walls diverging upwardly and outwardly from said plane at least substantially until each of said walls intersects with said flange, said side walls defining said rectangular volume of each admixing compartment being optically transparent so that said compartment can be utilized as a cuvette for optical analysis; an upper section having a plurality of separate reagent storage chambers adapted for communication with each of said compartments; restraining means to prevent the premature movement of prepackaged reagents from said plurality of reagent storage chambers said restraining means comprising a shearable layer disposed between said upper section and lower section, said layer being sufficiently strong so that it will shear only below a particular reagent storage chamber when application of force is made thereto from within said storage chamber; said upper section having a flange which encircles the lower perimeter of said plurality of reagent storage chambers and is wider along one longitudinal portion and adapted for the storage of information thereon, the area circumscribed by said upper section flange being substantially rectangular and substantially equal to the area circumscribed by said shearable layer and said lower section flange; said upper section, said restraining means and said lower section being securely mounted together.

20. A disposable reaction container comprising a lower section having at least one compartment for the admixing of materials added thereto, said lower section having a flange adjacent the upper perimeter thereof, the lower portion of each compartment comprising a bottom wall and a plurality of side walls, one pair of opposite side walls being sufficiently optically transparent and substantially vertical thereby defining an optical window through which optical analysis can be made, said substantially vertical side walls being connected to each other by curved wall portions adapted to eliminate corners or zones to which tabletted formulations might tend to gravitate during ultrasonic agitation thereof, said substantially vertical side walls and said curved wall portions being coupled to said flange by at least one pair of upwardly and outwardly diverging side wall extensions adapted to channel material added to each compartment to the lower portion thereof, an upper section securely mounted on said flange and having at least one separate reagent storage chamber adapted for communication with each of said compartments, and restraining means to prevent the premature movement of prepackaged reagents from each of said storage chambers.

21. The disposable reaction container of claim 20 wherein there are a plurality of separate admixing compartments and a plurality of reagent storage chambers associated with each of said compartments, said substantially vertical side walls being disposed parallel to the longitudinal axis of said disposable reaction chamber.

22. The disposable reaction container of claim 20 wherein said bottom wall of each compartment is of nonplanar configuration and adapted to effectively couple the transducing action of an ultrasonic mixer adjacent thereto whereby materials added to each admixing compartment can be thoroughly mixed.

23. The disposable reaction container of claim 20 wherein said upper section has a flange which encircles the lower perimeter thereof, said upper section flange being wider along one portion thereof and adapted for the storage of information thereon.

24. The disposable reaction container of claim 20 wherein all of said side wall extensions diverge upwardly and outwardly from said side walls substantially until each of said side wall extensions intersects with said flange.

25. The disposable reaction container of claim 20 wherein said upwardly and outwardly diverging side wall extensions terminate in uppermost side wall extensions immediately adjacent said flange and perpendicular thereto, said uppermost side wall extensions defining positive aligning surfaces adapted to aid in the positioning of said disposable reaction container.

26. A disposable reaction container comprising a lower section having a plurality of separate compartments for the admixing of materials added thereto, said lower section having a flange which encircles the upper perimeter of said lower section, the lower portion of each compartment comprising a bottom wall and a plurality of side walls, one pair of opposite side walls being sufficiently optically transparent and substantially vertical thereby defining an optical window through which optical analysis can be made, said substantially vertical side walls of each compartment being disposed substantially parallel to the longitudinal axis of said disposable reaction container and connected to each other by curved wall portions adapted to eliminate corners or zones to which tabletted formulations might tend to gravitate during ultrasonic agitation thereof, said substantially vertical side walls and said curved wall portions being coupled to said flange by upwardly and outwardly diverging side wall extensions, said side wall extensions terminating in uppermost side wall extensions immediately adjacent said flange and perpendicular thereto, said uppermost side wall extensions defining positive aligning surfaces adapted to aid in the positioning of said disposable reaction container, an upper section securely mounted on said flange and having a plurality of reagent storage chambers adapted for communication with each of said compartments, and restraining means to prevent the premature movement of prepackaged reagents from each of said storage chambers.

27. The disposable reaction container of claim 26 wherein said upper section has a flange which encircles the lower perimeter thereof, said upper section flange being wider along one longitudinal portion thereof and adapted for the storage of information thereon.

28. The disposable reaction container of claim 27 wherein said bottom wall of each compartment is of nonplanar configuration and adapted to effectively couple the transducing reaction of an ultrasonic mixer adjacent thereto whereby materials added to each admixing compartment can be thoroughly mixed.

29. The lower section of a disposable reaction chamber comprising at least one compartment for the admixing of materials added thereto, said lower section having a flange adjacent the upper perimeter thereof, the lower portion of each compartment comprising a bottom wall and substantially parallel and substantially perpendicular side walls, said side walls defining a substantially rectangular volume terminating in its uppermost portion in a plane substantially parallel to said flange, at least one pair of opposite side walls defining a portion of said rectangular volume of each compartment being sufficiently optically transparent and substantially vertical thereby defining an optical window through which optical analysis can be made, said side walls being coupled to said flange by at least one pair of upwardly and outwardly diverging side wall extensions adapted to channel materials added to each compartment to said lower portion thereof.

30. The lower section of claim 29 wherein there are a plurality of separate admixing compartments and the substantially vertical side walls of each compartment are disposed substantially parallel to the longitudinal axis of said lower section.

31. The lower section of claim 29 wherein said bottom wall of each compartment is flat.

32. The lower section of claim 29 wherein said bottom wall of each compartment is of non-planar configuration and adapted to effectively couple the transducing action of an ultrasonic mixer adjacent thereto whereby materials added to each admixing compartment can be thoroughly mixed.

33. The lower section of claim 29 wherein all of said sidewall extensions diverge upwardly and outwardly from said side walls substantially until each of said extensions intersects with said flange.

34. The lower section of claim 29 wherein each of said side wall extensions diverges upwardly and outwardly from said side walls toward said flange, at least one opposed pair of said side wall extensions terminating in uppermost side wall extensions immediately adjacent said flange and perpendicular thereto.

35. The lower section of claim 29 wherein said upwardly and outwardly diverging side wall extensions terminate in uppermost side wall extensions immediately adjacent said flange and perpendicular thereto, said uppermost side wall extensions defining positive aligning surfaces adapted to aid in the positioning of said lower section.

36. The lower section of claim 29 further including a recess centrally disposed below the bottom wall of each compartment and in communication therewith.

37. The lower section of claim 36 wherein said recess comprises a cylindrical volume defined by a circular side wall and a bottom wall.

38. The lower section of claim 29 wherein said flange is wider along one portion thereof and adapted for storage of information thereon.

39. The lower section of a disposable reaction container comprising a plurality of compartments for the admixing of materials added thereto, said lower section having a flange adjacent the upper perimeter thereof, the lower portion of each compartment comprising a bottom wall and substantially parallel and substantially perpendicular side walls, said sidewalls defining a substantially rectangular volume terminating in its uppermost portion in a plane substantially parallel to said flange, said side walls defining said rectangular volume of each admixing compartment being optically transparent so that said compartment can be utilized as a cuvette for optical analysis, said side walls being coupled to said flange by upwardly and outwardly diverging side wall extensions adapted to channel material added to each compartment to the lower portion thereof.

40. The lower section of a disposable reaction chamber comprising a plurality of compartments for the admixing of materials added thereto, said lower section having a flange adjacent the upper perimeter thereof, the lower portion of each compartment comprising a bottom wall and a plurality of side walls, one pair of opposite-side walls being sufficiently optically transparent and substantially vertical thereby defining an optical window through which optical analysis can be made, said substantially vertical side walls of each compartment being disposed substantially parallel to the longitudinal axis of said disposable reaction container and connected to each other by curved wall portions adapted to eliminate corners or zones to which tabletted formulations might tend to gravitate during ultrasonic agitation thereof, said substantially vertical side walls and said curved wall portions being coupled to said flange by upwardly and outwardly diverging side wall extensions adapted to channel material added to each compartment to the lower portion thereof.

41. The disposable reaction container of claim 40 wherein said bottom wall of each compartment is of non-planar configuration and adapted to effectively couple the transducing action of an ultrasonic mixer adjacent thereto whereby materials added to each admixing compartment can be thoroughly mixed.

42. The lower section of claim 40 wherein said flange is wider along one longitudinal portion thereof and adapted for the storage of information thereon.

43. The lower section of claim 40 wherein said side wall extensions diverge upwardly and outwardly from side walls, said side wall extensions terminating in uppermost side wall extensions immediately adjacent said flange and perpendicular thereto, said uppermost side wall extensions defining positive aligning surfaces adapted to aid in the positioning of said lower section.

44. The lower section of a disposable reaction container comprising at least one compartment for the admixing of materials added thereto, said lower section having a flange adjacent the upper perimeter thereof, the lower portion of each compartment comprising a bottom wall and a plurality of side walls, one pair of opposite side walls being sufficiently optically transparent and substantially vertical thereby defining an optical window through which optical analysis can be made, said substantially vertical side walls being connected to each other by curved wall portions adapted to eliminate corners or zones to which tabletted formulations might tend to gravitate during ultrasonic agitation thereof, said substantially vertical sidewalls and said curved wall portions being coupled to said flange by at least one pair of upwardly and outwardly diverging side wall extensions adapted to channel materials added to each compartment to said lower portion thereof.

45. The lower section of claim 44 wherein all of said side wall extensions diverge upwardly and outwardly from said side walls substantially until each of said extensions intersects with said flange.

46. The lower section of claim 44 wherein each of said side wall extensions diverges upwardly and outwardly from said side walls toward said flange, at least one opposed pair of said sidewall extensions terminating in uppermost side wall extensions immediately adjacent said flange and perpendicular thereto.

47. The lower section of claim 44 wherein each of said side wall extensions diverge upwardly and outwardly from said side walls toward said flange, said side wall extensions terminating in uppermost side wall extensions immediately adjacent said flange and perpendicular thereto, said uppermost side wall extensions defining positive aligning surfaces adapted to aid in the positioning of said lower section.

References Cited

UNITED STATES PATENTS 3,476,515   11/1969   Johnson et al. _____ 23—253X

MORRIS O. WOLK, Primary Examiner

R. E. SERWIN, Assistant Examiner

U.S. Cl. X.R.

23—230, 259, 292; 206—47; 220—23, 23.8